(12) United States Patent
Ting et al.

(10) Patent No.: US 11,880,037 B2
(45) Date of Patent: *Jan. 23, 2024

(54) CONTROL METHOD

(71) Applicant: InnoLux Corporation, Miao-Li County (TW)

(72) Inventors: Chin-Lung Ting, Miao-Li County (TW); Yu-Chia Huang, Miao-Li County (TW); Ming-Chia Shih, Miao-Li County (TW); Hong-Sheng Hsieh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,550

(22) Filed: Mar. 7, 2023

(65) Prior Publication Data

US 2023/0204956 A1 Jun. 29, 2023

Related U.S. Application Data

(63) Continuation of application No. 17/462,494, filed on Aug. 31, 2021, now Pat. No. 11,624,911.

(30) Foreign Application Priority Data

Sep. 2, 2020 (CN) .......................... 202010909397.1
Aug. 5, 2021 (CN) .......................... 202110895596.6

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *B60K 2370/27* (2019.05); *G02B 2027/0118* (2013.01); *G02B 2027/0196* (2013.01)

(58) Field of Classification Search
CPC ........ G02B 27/0101; G02B 2027/0118; B60K 35/00; B60K 2370/1529
See application file for complete search history.

(56) References Cited

U.S. PATENT DOCUMENTS

| 11,624,911 B2 * | 4/2023 | Ting ..................... H04N 9/3173 359/630 |
| 2005/0243078 A1 * | 11/2005 | Ozeki ................... G02F 1/1375 345/3.1 |

* cited by examiner

*Primary Examiner* — Ryan D Howard
(74) *Attorney, Agent, or Firm* — McClure, Qualey & Rodack, LLP (57) ABSTRACT

A control method applied in a display device is provided. The display device includes an image generator and a screen. The image generator is directed to output an output image. The screen is directed to operate in a first operation mode or a second operation mode. The screen has a first light-transmittance in the first operation mode and has a second light-transmittance in the second operation mode. The first light-transmittance is different from the second light-transmittance. In response to the screen operating in the first operation mode or the second operation mode, the image generator outputs the output image onto the screen in a light-emitting period and stops outputting the output image onto the screen in a non-light-emitting period after the light-emitting period.

14 Claims, 9 Drawing Sheets

CONTROL METHOD

CROSS REFERENCE TO RELATED APPLICATIONS

This Application is a Continuation of application Ser. No. 17/462,494, filed Aug. 31, 2021, which claims priority of China Patent Application No. 202010909397.1, filed on Sep. 2, 2020 and priority of China Patent Application No. 202110895596.6, filed on Aug. 5, 2021, which are hereby incorporated by reference herein.

BACKGROUND OF THE DISCLOSURE

Field of the Disclosure

The disclosure relates to a display device, and more particularly to a display device that comprises a screen.

Description of the Related Art

Current display devices can be used in projection system display devices. The projection system display devices need to cooperate with the screen for display. How to achieve a better user experience with lower power consumption is one of the research topics in the industry.

BRIEF SUMMARY OF THE DISCLOSURE

In accordance with an embodiment of the disclosure, a control method is applied in a display device. The display device comprises an image generator and a screen. The control method comprises directing the image generator to output an output image; and directing the screen to operate in a first operation mode or a second operation mode. The screen has a first light-transmittance in the first operation mode and has a second light-transmittance in the second operation mode. The first light-transmittance is different from the second light-transmittance. In response to the screen operating in the first operation mode or the second operation mode, the image generator outputs the output image onto the screen in a light-emitting period and stops outputting the output image onto the screen in a non-light-emitting period after the light-emitting period.

In accordance with a further embodiment of the disclosure, a control method is applied in a display device. The display device comprises an image generator and a screen and is disposed in front of a front seat of a vehicle. The control method comprises directing the image generator to output an output image; and directing the screen to operate in a first operation mode or a second operation mode. The screen has a first light-transmittance in the first operation mode and has a second light-transmittance in the second operation mode. The first light-transmittance is different from the second light-transmittance. In response to the screen operating in the first operation mode or the second operation mode, the image generator outputs the output image onto the screen in a light-emitting period and stops outputting the output image onto the screen in a non-light-emitting period after the light-emitting period.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

In order to make the purpose, characteristics and advantages of the disclosure more obvious and understandable, embodiments are given in the following paragraphs and detailed explanations are made in accordance with the attached drawings. The specification of the disclosure provides different embodiments to illustrate the technical characteristics of different embodiments of the disclosure. The configuration of the components in embodiments is for illustrative purposes and is not intended to limit the present disclosure. In addition, the partial repetition of the appended drawing labels in the embodiments is for simplification and does not imply a correlation between the different embodiments.

Throughout the specification of the disclosure and the attached claims, certain terms are used to refer to specific components. Technicians in this field should understand that electronic device manufacturers may refer to the same component by different names, and it is not intended to distinguish between components that perform the same function but have different names. In the specification of the disclosure and the attached claims, the terms "include" and "comprise" are used in an open-ended fashion, and thus should be interpreted to mean "include, but not limited to . . .".

The directions mentioned in the following embodiments, such as: up, down, left, right, forward or rear, etc., are the directions referred to in the attached drawing. Therefore, the directional terms used are intended to illustrate and not to limit the present disclosure. It is important to understand that components with specific descriptions or icons can exist in a variety of forms familiar to the technical person. In addition, when a component or film is referred to as being "on", or "connected to" another component or film, it can be directly on, or connected to the other component or film or intervening components or films may be present (indirectly). In contrast, when a component or film is referred to as be "directly on", "directly connected to" another component or film, there are no intervening components or films present.

The ordinal numbers used in the specifications and claims, such as the terms "first", "second", etc. to refer to the claimed components do not in themselves imply any prior ordinal number of the claimed components, nor the order in which one claimed component relates to another claimed component, or the order in the method of manufacture. The ordinal number is used to distinguish one element from another.

It should be noted that the technical solutions provided by the different embodiments below may be interchangeable, combined or mixed to constitute another embodiment without violating the spirit of the disclosure.

Figure 1:
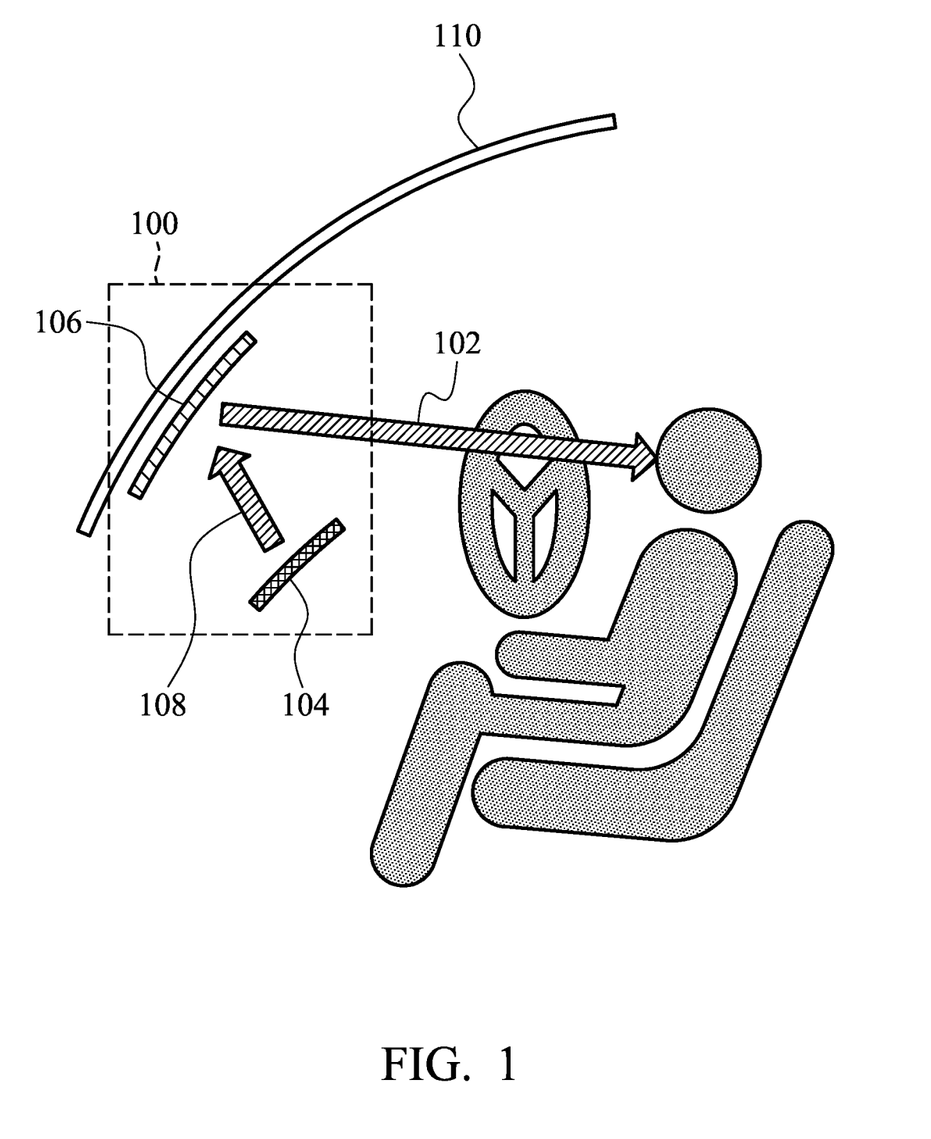
FIG. 1 is a schematic diagram of an exemplary embodiment of a display device according to various aspects of the present disclosure.

FIG. 1 is a schematic diagram of an exemplary embodiment of a display device according to various aspects of the present disclosure. In this embodiment, the display device 100 is applied to a vehicle, but the disclosure is not limited thereto. In one embodiment, the display device 100 is applied in an augmented reality system, smart glass, smart window or a projection system. In other embodiments, the display device 100 may be applied to an aircraft or another means of transport. In one embodiment, the display device 100 is a heads up display (HUD). In this case, the display device 100 provides information related to driving directly to the user. Therefore, the user does not need to look down to get information about driving. In this embodiment, the display device 100 comprises an image generator 104 and a photo-switchable screen 106.

The image generator 104 outputs an output image 108. For example, in a light-emitting period, the image generator 104 outputs the output image 108. In an non-light-emitting period, the image generator 104 stops outputting the output image 108. The disclosure does not limit how image generator 104 may output the output image 108 by projection or by optical fiber or waveguide. In one embodiment, the image generator 104 may utilize a periodicity method to output the output image 108. In one embodiment, in the light-emitting period, a light source or a plurality of light source (not shown) in the image generator 104 is turned on. At this time, the image generator 104 outputs the output image 108. In the non-light-emitting period, a light source or many light source in the image generator 104 is turned off. At this time, the image generator 104 stops outputting the output image 108. In this embodiment, since the image generator 104 does not continuously output the output image 108, the power consumption of the image generator 104 can be reduced.

The kind of image generator 104 is not limited in the present disclosure. In one embodiment, the image generator 104 is a projector. In other embodiments, the image generator 104 may comprise a liquid-crystal display, or light-emitting diode (LED), wherein the light-emitting diode may comprise an organic light-emitting diode (OLED), a mini LED, a micro LED, a quantum dot (QD) (such as QLED or QDOLED), fluorescence, phosphors, another suitable material, or a combination thereof, but the disclosure is not limited thereto. A splicing device may be, for example, a display splicing device, but disclosure is not limited thereto. It should be noted that an electronic device can be any combination of the foregoing, but disclosure is not limited thereto. Hereinafter, a display device will be used as an electronic device or a splicing device to illustrate the content of the present disclosure, but the present disclosure is not limited thereto.

The photo-switchable screen 106 may operate in a first operation mode or a second operation mode. In the first operation mode, the photo-switchable screen 106 has a first light-transmittance. At this time, if the image generator 104 outputs the output image 108, the photo-switchable screen 106 may generate image information 102 according to the output image 108. Therefore, users can directly obtain driving related information, such as speed or navigation information, according to the image information 102 displayed on the photo-switchable screen 106.

In some embodiments, when a light-source or a plurality of light-sources (not shown) in the image generator 104 are turned off, the photo-switchable screen 106 is not activated. The period when the light-sources in the image generator 104 are turned off is referred to as a non-light-emitting period. In such cases, when a light-source or a plurality of light-sources in the image generator 104 are turned on, the photo-switchable screen 106 may be activated or not activated. The period when the light-sources in the image generator 104 are turned on is referred to as a light-emitting period.

The disclosure does not limit how the photo-switchable screen 106 generates the image information 102. In one embodiment, the photo-switchable screen 106 intermittently generates the image information 102. For example, when the vehicle having the photo-switchable screen 106 is stopped in a traffic jam or at a red light, the photo-switchable screen 106 stops providing the image information 102. In this case, when the vehicle is moving, the photo-switchable screen 106 provides the image information 102. In one embodiment, the photo-switchable screen 106 may reflect the output image 108 and serve the reflected image as the image information 102. In other embodiments, the photo-switchable screen 106 may utilize a projection method or a scattering method, or reduce light transmittance to block the ambient light so that the reflected image information 102 has better contrast. The photo-switchable screen 106 may increase reflectivity so that the reflected image information 102 has a higher brightness. The material of photo-switchable screen 106 is not limited in the present disclosure. In one embodiment, the photo-switchable screen 106 comprises dye-doped liquid crystal, polymer-dispersed liquid-crystal (PDLC), polymer network liquid-crystal (PNLC), cholesteric liquid-crystal (CLC), electrochromic (EC) material, suspended particle device (SPD), liquid-crystal lens, photonic crystal, or a holographic optical element (HOE).

However, when the photo-switchable screen 106 operates in the second operation mode, the photo-switchable screen 106 has a second light-transmittance. In this embodiment, the first light-transmittance is less than the second light-transmittance. In some embodiments, the photo-switchable screen 106 determines whether to operate in the first operation mode according to a control signal (not shown). For example, when the level of the control signal is a specific level (such as a high level), the photo-switchable screen 106 operates in the first operation mode. When the level of the control signal is not the specific level, the photo-switchable screen 106 operates in the second operation mode. In some embodiments, the second light-transmittance is approximately 50%-99%.

In other embodiment, when the control signal at a first level, the photo-switchable screen 106 operates in a first operation mode. In the first operation mode, the photo-switchable screen 106 has a first light-transmittance. In such case, when the control signal at a second level, the photo-switchable screen 106 operates in a second operation mode. In the second operation mode, the photo-switchable screen 106 has a second light-transmittance. When the control signal at a third level, the photo-switchable screen 106 operates in a third operation mode. In the third operation mode, the photo-switchable screen 106 has a third light-transmittance. The first light-transmittance is less than the second light-transmittance, and the second light-transmittance is less than the third light-transmittance.

In some embodiments, the photo-switchable screen 106 comprises a windshield 110 or is disposed inside the windshield 110, outside of the windshield 110 or on the windshield 110, but the disclosure is not limited thereto. Since the photo-switchable screen 106 provides the low light-transmittance, the power consumption of the photo-switchable screen 106 can be reduced. In addition, the high transparency of the windshield 110 can be maintained when the photo-switchable screen 106 provides high light-transmittance. In some embodiment, the light-transmittance (or referred to as penetration rate) depends on the ratio of the intensity of penetration light to the intensity of reference light. The measurements of the intensity of penetration light and the intensity of reference light may be the integration of multiple light-emitting angles, or the intensity of a specific light-emitting angle, for example, the vertical angle perpendicular to the light-emitting surface is taken as the specific light-emitting angle. The penetration rate may be an equivalent penetration rate. The equivalent penetration rate is the integral sum of multiple penetration rates in a certain integration time and divided by the integration time. The location of photo-switchable screen 106 is not limited in the present disclosure. In one embodiment, the photo-switchable screen 106 is disposed on the windshield 110 of the vehicle. In this case, users can directly obtain speed or navigation information according to the image information 102 provided by the photo-switchable screen 106.

Figure 2A:
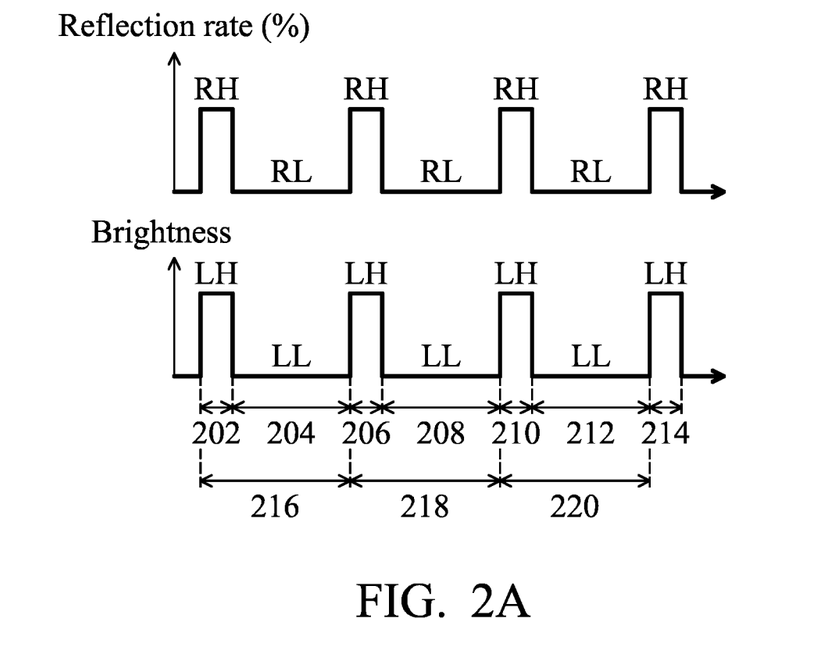
FIG. 2A is an operation schematic diagram of an exemplary embodiment of an image generator and a photo-switchable screen according to various aspects of the present disclosure.

FIG. 2A is an operation schematic diagram of an exemplary embodiment of the image generator 104 and the photo-switchable screen 106 according to various aspects of the present disclosure. To brevity, assume that the image generator 104 has a light-source or a plurality of light-sources. In this case, when the light-sources are turned on, the image generator 104 outputs the output image 108. When the light-source are turned off, the image generator 104 stops outputting the output image 108. Additionally, assume that the photo-switchable screen 106 is a cholesteric liquid-crystal display. In this case, when the cholesteric liquid-crystal display has a high reflection rate RH, it means that the light-transmittance of the cholesteric liquid-crystal display is low. When the cholesteric liquid-crystal display has a low reflection rate RL, it means that the light-transmittance of the cholesteric liquid-crystal display is high. In this case, the high reflection rate RH is larger than the low reflection rate RL.

In FIG. 2A, in the light-emitting periods 202, 206, 210, and 214, the light-sources of the image generator 104 are turned on. Therefore, the brightness of the light-source is the high brightness value LH. At this time, the image generator 104 outputs the output image 108. However, in the non-light-emitting periods 204, 208, and 212, the light-sources of the image generator 104 are turned off. Therefore, the brightness of the light-source is the low brightness value LL. The high brightness value LH is larger than the low brightness value LL (LH>LL). At this time, the image generator 104 stops outputting the output image 108. In this embodiment, since the brightness of the light-sources of the image generator 104 does not need to be continuously maintained at the high brightness value LH, the power consumption of the image generator 104 can be reduced.

In this embodiment, in the light-emitting periods 202, 206, 210, and 214, the photo-switchable screen 106 operates in the first operation mode. In the first operation mode, the photo-switchable screen 106 has a high reflection rate RH (i.e., a low light-transmittance). At this time, since the image generator 104 outputs the output image 108 such that the photo-switchable screen 106 can generate the image information 102. In the non-light-emitting periods 204, 208, and 212, the photo-switchable screen 106 operates in the second operation mode. Therefore, the photo-switchable screen 106 has a low reflection rate RL (i.e., a high light-transmittance). Since the photo-switchable screen 106 does not need to continually provide the high reflection rate RH (i.e., the low light-transmittance), the power consumption of the photo-switchable screen 106 can be reduced.

In one embodiment, the duration of the light-emitting period 202, the duration of the light-emitting period 206, the duration of the light-emitting period 210, and the duration of the light-emitting period 214 are the same, but the disclosure is not limited thereto. In other embodiment, at least one of the duration of the light-emitting period 202, the duration of the light-emitting period 206, the duration of the light-emitting period 210, and the duration of the light-emitting period 214 is different from another of the duration of the light-emitting period 202, the duration of the light-emitting period 206, the duration of the light-emitting period 210, and the duration of the light-emitting period 214. Furthermore, the duration of the non-light-emitting period 204, the duration of the non-light-emitting period 208, and the duration of the non-light-emitting period 212 are the same, but the disclosure is not limited thereto. In other embodiments, one of the duration of the non-light-emitting period 204, the duration of the non-light-emitting period 208, and the duration of the light-emitting period 212 is different from another of the duration of the non-light-emitting period 204, the duration of the non-light-emitting period 208, and the duration of the light-emitting period 212. In some embodiment, the light-emitting period may be 1.6 milliseconds (ms), 4.3 ms, 1 second (sec), 1 minute (min), 10 min, or 0.5 hour (hr), but the disclosure is not limited thereto.

In other embodiments, the duration of the light-emitting period 202 and the duration of the non-light-emitting period 204 constitute frame time 216. Additionally, the duration of the light-emitting period 206 and the duration of the non-light-emitting period 208 constitute frame time 218. The duration of the light-emitting period 210 and the duration of the non-light-emitting period 212 constitute frame time 220. In one embodiment, the frame time 216, 218 and 220 is about 16.6 ms.

In another embodiment, the duration of the light-emitting period 202 is 10%-50% of the frame time 216. In this case, the duration of the light-emitting period 202 is about 1.6 ms-4.3 ms. In some embodiments, the reflection rate of the photo-switchable screen 106 is changed between the high reflection rate RH and the low reflection rate RL so that an equivalent reflection rate of the photo-switchable screen 106 is an average of the high reflection rate RH and the low reflection rate RL. In another embodiment, the frequency at which the reflection rate of the photo-switchable screen 106 changes between the high reflection rate RH and the low reflection rate RL may be higher than the speed at which the human eye can see (e.g., the frequency of changing the reflection rate of the photo-switchable screen 106 may be higher than 60 Hz). Furthermore, since the brightness of the light-source of the image generator 104 is changed between the high brightness value LH and the low brightness value LL, an equivalent brightness of the image generator 104 is an average of the high brightness value LH and the low brightness value LL.

Figure 2B:
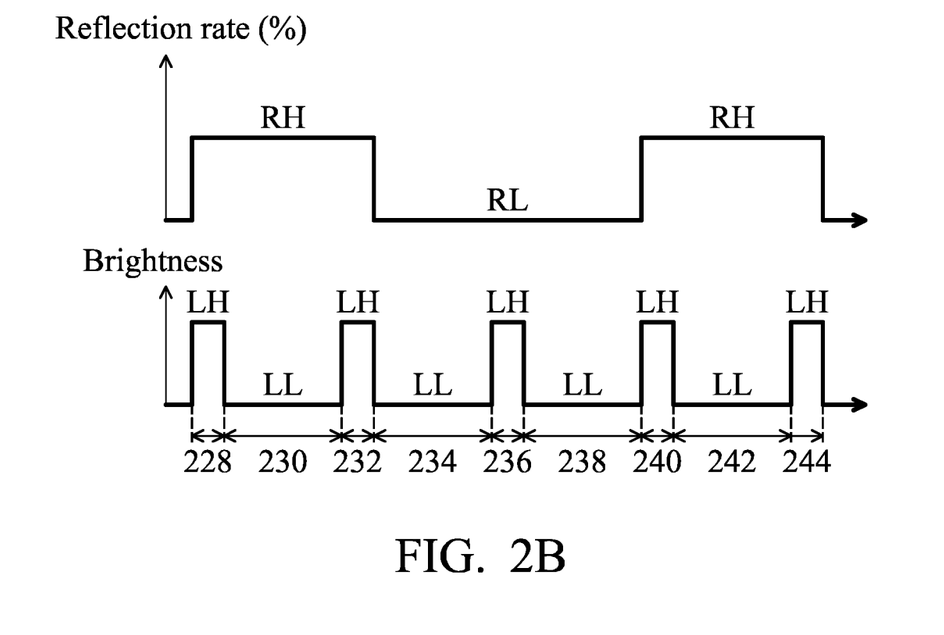
FIG. 2B is an operation schematic diagram of another exemplary embodiment of the image generator and the photo-switchable screen according to various aspects of the present disclosure.

FIG. 2B is an operation schematic diagram of another exemplary embodiment of the image generator 104 and the photo-switchable screen 106 according to various aspects of the present disclosure. In the light-emitting periods 228, 232, 236, 240, and 244, the light-sources of the image generator 104 are turned on so that the brightness value of the light-source is the high brightness value LH. At this time, the image generator 104 outputs the output image 108. However, in the non-light-emitting periods 230, 234, 238, and 242, the light-sources of the image generator 104 are turned off so that the brightness value of the light-source is the low brightness value LL. At this time, the image generator 104 stops outputting the output image 108. In this case, the durations of the light-emitting periods 228, 232, 236, 240, and 244 are the same as each other, and the durations of the non-light-emitting periods 230, 234, 238, and 242 are the same as each other.

In this embodiment, in the light-emitting period 228, the non-light-emitting period 230, and the light-emitting period 232, the photo-switchable screen 106 operates in the first operation mode. In the first operation mode, the photo-switchable screen 106 has the high reflection rate RH. At this time, since the light-transmittance of the photo-switchable screen 106 is low, the photo-switchable screen 106 is capable of reflecting the output image 108 to generate the image information 102. In this case, although the image generator 104 stops outputting the output image 108 in the non-light-emitting period 230, the users can continually observe the image information 102 because the persistence-of-vision phenomenon occurs and the image generator 104 outputs the output image 108 again in the light-emitting period 232.

In the non-light-emitting period 234, the light-emitting period 236, and the non-light-emitting period 238, the photo-switchable screen 106 operates in the second operation mode. At this time, the photo-switchable screen 106 has the low light-transmittance RL. Therefore, the photo-switchable screen 106 provisionally stops reflecting the output image 108.

In the light-emitting period 240, the non-light-emitting period 242, and the light-emitting period 244, the photo-switchable screen 106 operates in the first operation mode again. Therefore, the photo-switchable screen 106 has the high reflection rate RH. At this time, since the light-transmittance of the photo-switchable screen 106 is low, the photo-switchable screen 106 may re-reflect the output image 108. In this case, although the image generator 104 stops outputting the output image 108 in the non-light-emitting period 242, the users still continually observes the image information 102 due to the persistence-of-vision phenomenon.

In one embodiment, the frequency at which the image generator 104 outputs the output image 108 is a first frequency, and the frequency at which the photo-switchable screen 106 generates the image information is a second frequency. In this case, there is a multiple relationship between the first frequency and the second frequency. For example, the first frequency is 60 Hz, and the second frequency is 30 Hz.

Figure 2C:
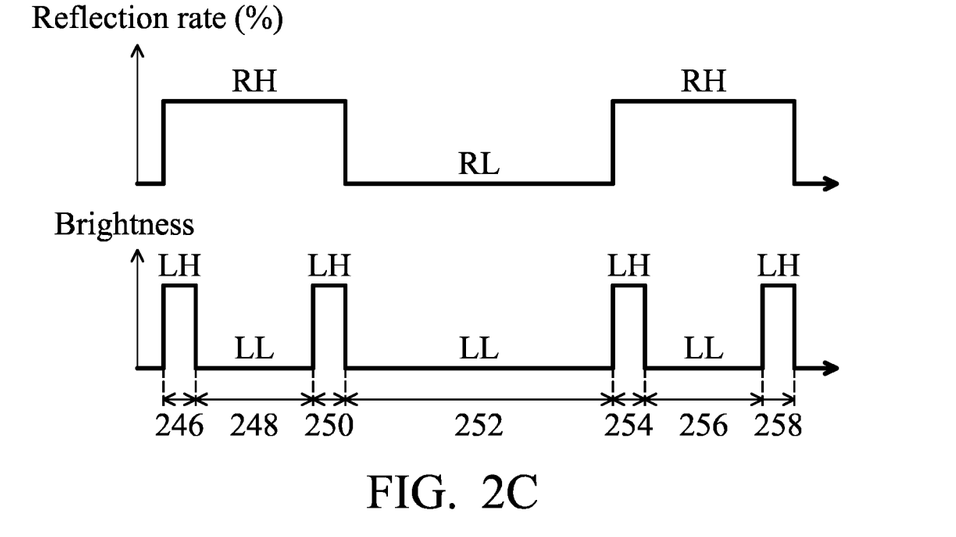
FIG. 2C is an operation schematic diagram of another exemplary embodiment of the image generator and the photo-switchable screen according to various aspects of the present disclosure.

FIG. 2C is an operation schematic diagram of another exemplary embodiment of the image generator 104 and the photo-switchable screen 106 according to various aspects of the present disclosure. When the photo-switchable screen 106 operates in the second operation mode (i.e., the non-light-emitting period 252), the light-sources of the image generator 104 are turned off. At this time, the brightness value of the light-source of the image generator 104 is the low brightness value LL.

In this embodiment, in the light-emitting periods 246, 250, 254, and 258, the light-sources of the image generator 104 are turned on. Therefore, the image generator 104 outputs the output image 108. In the non-light-emitting periods 248, 252, and 256, the light-sources of the image generator 104 are turned off. Since the brightness value of the light-sources of the image generator 104 is the low brightness value LL, the output image 108 cannot be output from the image generator 104. In one embodiment, the durations of the light-emitting periods 246, 250, 254, and 258 are the same as each other. Additionally, the durations of the non-light-emitting periods 248 and 256 may be the same as each other, but the duration of the non-light-emitting period 248 or 256 may be less than the duration of the non-light-emitting period 252.

In the light-emitting period 246, the non-light-emitting period 248, and the light-emitting period 250, the photo-switchable screen 106 operates in the first operation mode. In the first operation mode, the photo-switchable screen 106 has the high reflection rate RH. At this time, since the photo-switchable screen 106 has the low light-transmittance, the photo-switchable screen 106 is capable of reflecting the output image 108 to generate a reflection image and provides the reflection image as the image information 102.

In the non-light-emitting period 252, the photo-switchable screen 106 operates in the second operation mode. At this time, the photo-switchable screen 106 has the low reflection rate RL. Since the photo-switchable screen 106 has the high light-transmittance, the photo-switchable screen 106 cannot reflect the output image 108. Therefore, in the non-light-emitting period 252, the photo-switchable screen 106 stops providing the image information 102. However, the user does not discover the flickering image information 102 due to the persistence-of-vision phenomenon.

In the light-emitting period 254, the non-light-emitting period 256, and the light-emitting period 258, the photo-switchable screen 106 operates in the first operation mode again. At this time, the photo-switchable screen 106 has the high reflection rate RH. Since the light-transmittance of the photo-switchable screen 106 is low, the photo-switchable screen 106 can reflect the output image 108 to generate the image information 102.

Figure 2D:
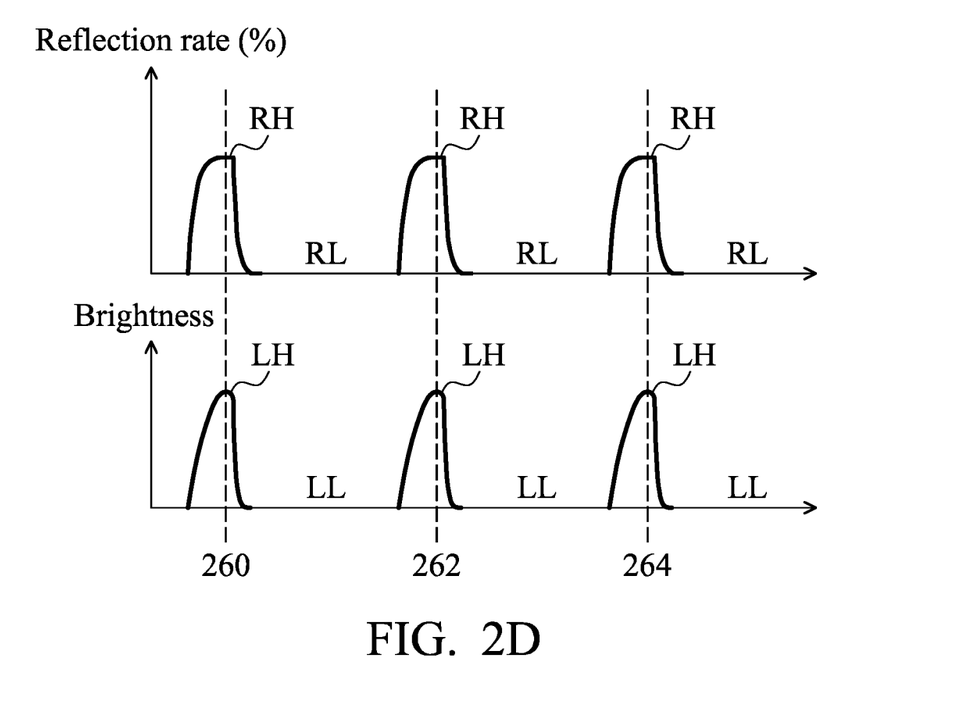
FIG. 2D is an operation schematic diagram of another exemplary embodiment of the image generator and the photo-switchable screen according to various aspects of the present disclosure.

FIG. 2D is an operation schematic diagram of another exemplary embodiment of the actual brightness of the image generator 104 and the light-transmittance of the photo-switchable screen according to various aspects of the present disclosure. The image generator 104 and the photo-switchable screen 106 may not match at all time points due to delays caused by various factors (such as RC delay and response time of a material). Therefore, the image generator 104 and the photo-switchable screen 106 cannot maintain the corresponding target values (e.g., the high brightness value RH, or the low brightness value LH) for a long time. However, it is required that the time point when the brightness of the light-source of the image generator 104 arrives a first target value (e.g., the high brightness value LH) corresponds to the time point when the reflection rate of the photo-switchable screen 106 arrives a second target value (e.g., the high reflection rate RH). For example, in the time points 260, 262, and 264, the brightness of the image generator 104 arrives the high brightness value LH, and the reflection rate of the photo-switchable screen 106 arrives the high reflection rate RH so that the image information 102 can be generated.

Figure 2E:
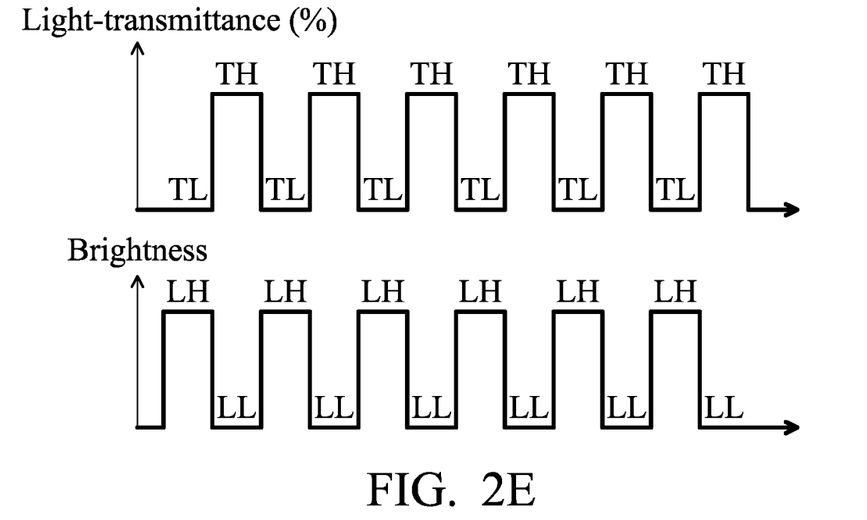
FIG. 2E is a schematic diagram of another exemplary embodiment of the brightness of the image generator and the light-transmittance of the photo-switchable screen according to various aspects of the present disclosure.

FIG. 2E is a schematic diagram of another exemplary embodiment of the brightness of the image generator 104 and the light-transmittance of the photo-switchable screen 106 according to various aspects of the present disclosure. In one embodiment, when the photo-switchable screen 106 on the windshield 110 is a component (e.g., a dye-doped liquid-crystal or a electrochromic material) which has a variable light-transmittance, the photo-switchable screen 106 at least has the high light-transmittance TH and the low light-transmittance TL. When the brightness of the light-source of the image generator 104 is equal to the high brightness value LH, the photo-switchable screen 106 provides the low light-transmittance TL. When the brightness of the light-source of the image generator 104 is equal to the low brightness value LL, the photo-switchable screen 106 provides the high light-transmittance TH.

Figure 2F:
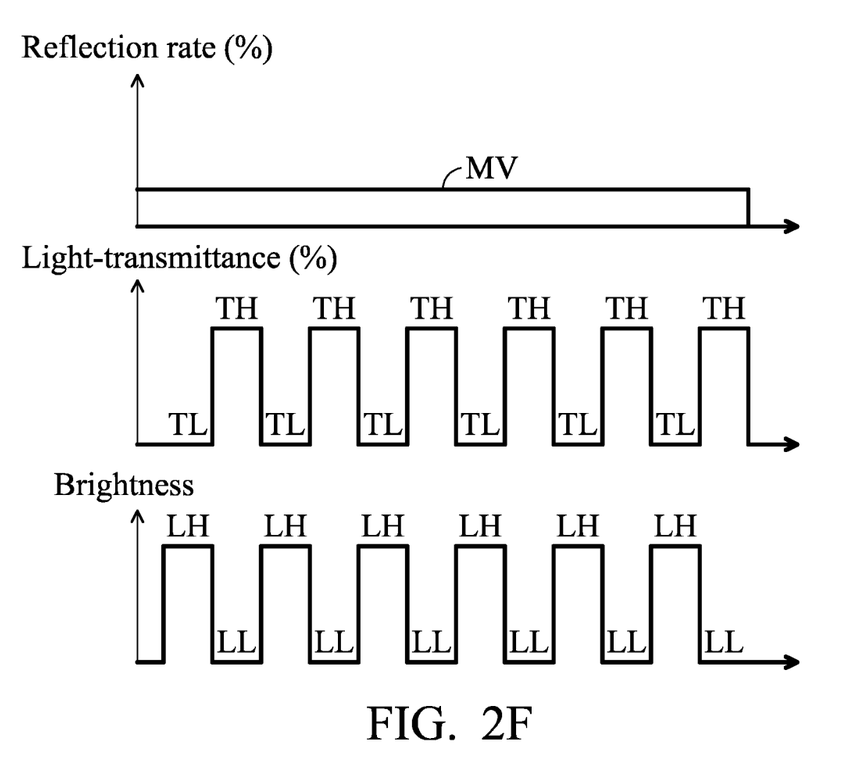
FIG. 2F is a schematic diagram of an exemplary embodiment of the light-transmittance and reflection rate of the photo-switchable screen according to various aspects of the present disclosure.

FIG. 2F is a schematic diagram of an exemplary embodiment of the light-transmittance and reflection rate of the photo-switchable screen 106 according to various aspects of the present disclosure. FIG. 2F is similar to FIG. 2E exception that FIG. 2F shows the reflection rate of the photo-switchable screen 106. As shown in FIG. 2F, although the light-transmittance of the photo-switchable screen 106 is changed between the high light-transmittance TH and the low light-transmittance TL, the reflection rate of the photo-switchable screen 106 is maintained at a fixed value MV.

Figure 2G:
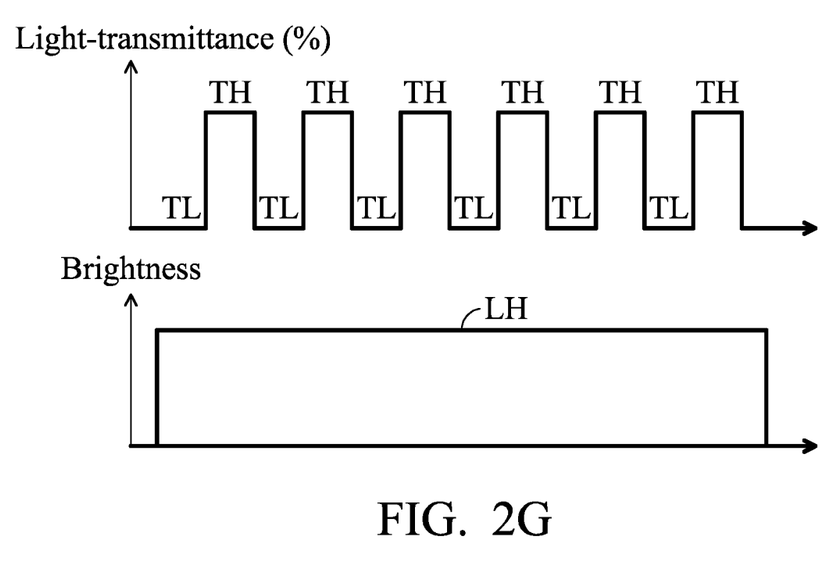
FIG. 2G is a schematic diagram of another exemplary embodiment of the brightness of the image generator and the light-transmittance of the photo-switchable screen according to various aspects of the present disclosure.

FIG. 2G is a schematic diagram of another exemplary embodiment of the brightness of the image generator 104 and the light-transmittance of the photo-switchable screen 106 according to various aspects of the present disclosure. In this embodiment, the light-transmittance of the photo-switchable screen 106 is changed between the high light-transmittance TH and the low light-transmittance TL, for example, the photo-switchable screen 106 is switched between on (activated) and off (not activated). At this time, if the brightness of the light-source of the image generator 104 is maintained at the high brightness value LH and outputs a static image (e.g., in a first light-emitting period), the photo-switchable screen 106 displays the static image. In some embodiments, when the brightness of the light-source of the image generator 104 is not maintained at the high brightness value LH (e.g., in a first non-light-emitting period), the light-transmittance of the photo-switchable screen 106 is the low light-transmittance TL (e.g., the photo-switchable screen 106 is not activated or does not output any image). At this time, the photo-switchable screen 106 does not display any image.

Figure 3:
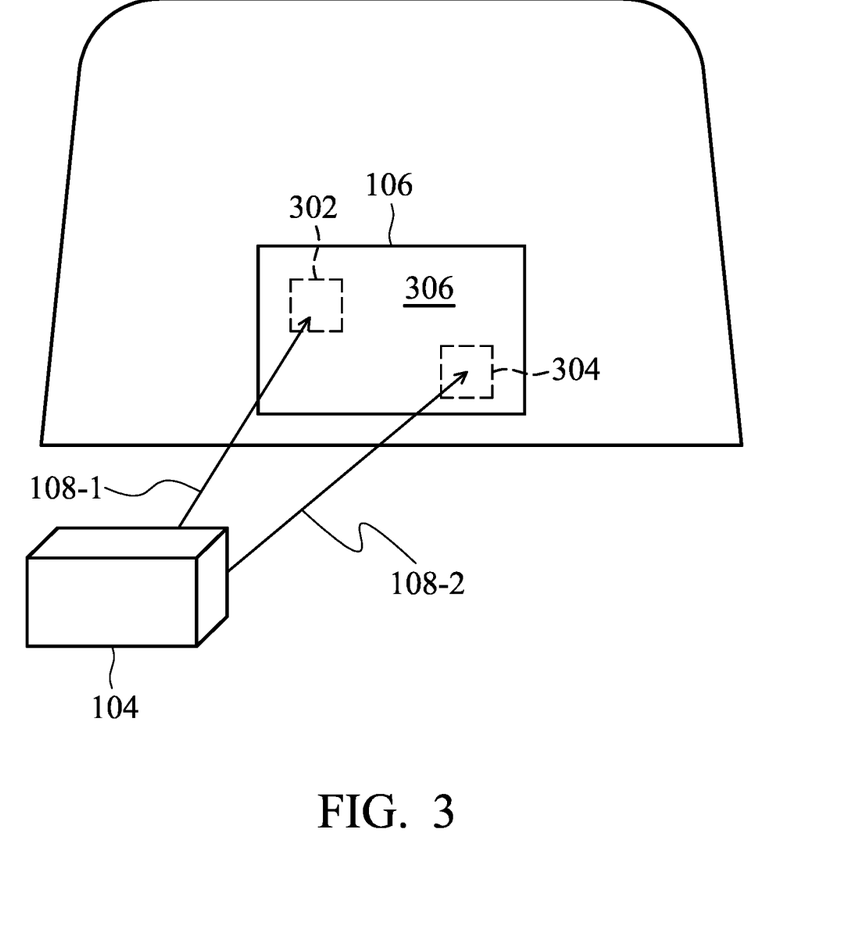
FIG. 3 is an operation schematic diagram of another exemplary embodiment of the image generator and the photo-switchable screen according to various aspects of the present disclosure.

FIG. 3 is an operation schematic diagram of another exemplary embodiment of the image generator 104 and the photo-switchable screen 106 according to various aspects of the present disclosure. When the image generator 104 outputs the output image 108-1 to the area 302 of the photo-switchable screen 106 and outputs the output image 108-2 to the area 304 of the photo-switchable screen 106, the photo-switchable screen 106 receives the output images from the areas 302 and 304. In this embodiment, the areas 302 and 304 of the photo-switchable screen 106 may have the low light-transmittance. Therefore, the area 302 is capable of reflecting the output image 108-1, and the area 304 is capable of reflecting the output image 108-2. In this embodiment, since the image generator 104 does not output the output image to the area 306, the photo-switchable screen 106 sets the area 306 to provide the high light-transmittance. In this case, the area 306 is the area outside of the areas 302 and 304.

In some embodiments, the photo-switchable screen 106 comprises many sensors (not shown) to detect which areas receive the output image. For example, when the image generator 104 outputs the output image 108-1 to the area 302, the sensor in the area 302 outputs a high level. However, when the image generator 104 stops outputting the output image 108-1, the sensor in the area 302 outputs a low level. In such cases, the output of the sensor is utilized to determine whether the area 302 receives the output image 108-1. In another embodiment, before the image generator 104 outputs the output images 108-1 and 108-2, the image generator 104 notifies the photo-switchable screen 106. In this case, the photo-switchable screen 106 sets the light-transmittance of the corresponding area (e.g., 302 and 304) to the low light-transmittance according to the information provided by the image generator 104.

Figure 4:
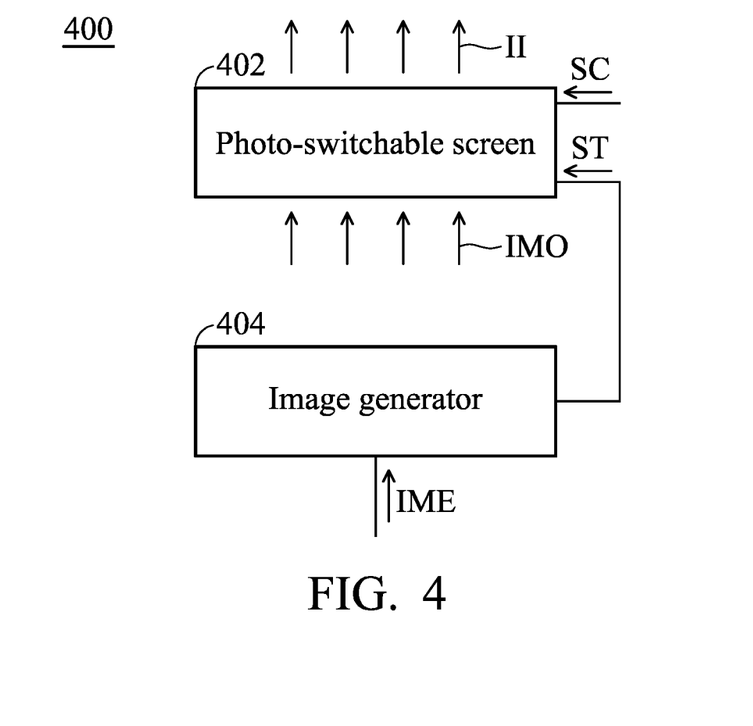
FIG. 4 is a control schematic diagram of an exemplary embodiment of the heads-up display according to various aspects of the present disclosure.

FIG. 4 is a control schematic diagram of an exemplary embodiment of the display device according to various aspects of the present disclosure. As shown in FIG. 4, the display device 400 comprises a photo-switchable screen 402 and an image generator 404. The image generator 404 generates an output image IMO according to external information IME. In this embodiment, the image generator 404 generates a trigger signal ST. After receiving the trigger signal ST, the photo-switchable screen 402 determines whether to operate in the first operation mode according to a control signal SC.

Taking a cholesteric liquid-crystal (CLC) are an example, when the control signal SC is at a high level (e.g., 5V), the photo-switchable screen 402 operates in the first operation mode. At this time, the photo-switchable screen 402 has a low light-transmittance (i.e., a high reflection rate). Therefore, the photo-switchable screen 402 can reflect the output image IMO to generate image information II. However, when the control signal SC is at a low level (e.g., 0V), the photo-switchable screen 402 operates in the second operation mode. At this time, the photo-switchable screen 402 has a high light-transmittance (i.e., a low reflection rate). Therefore, the output image IMO cannot be reflected toward human-eye via the photo-switchable screen 402.

Figure 5:
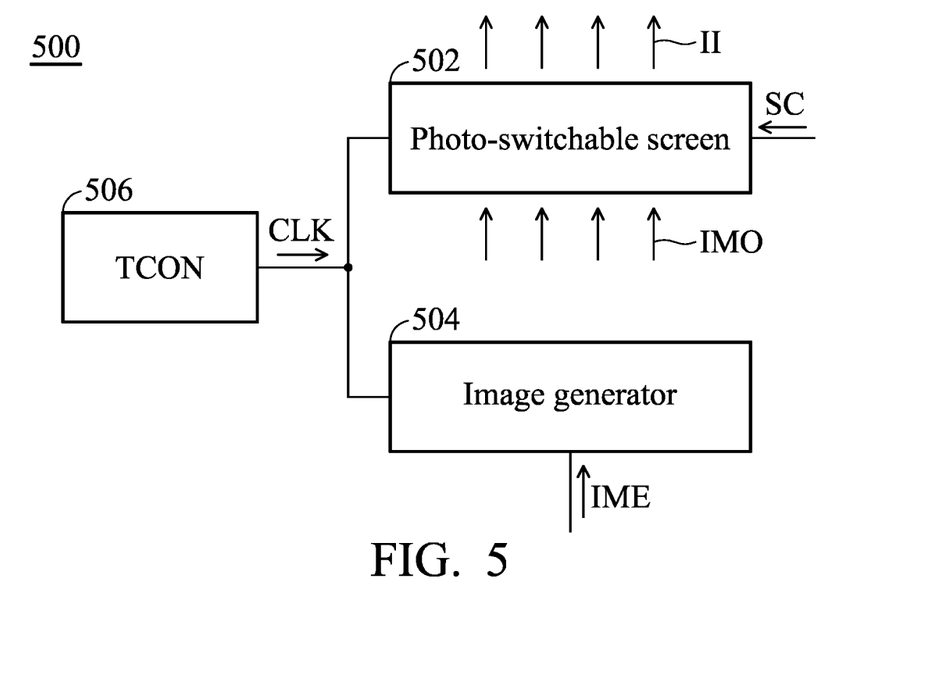
FIG. 5 is a control schematic diagram of another exemplary embodiment of the heads-up display according to various aspects of the present disclosure.

FIG. 5 is a control schematic diagram of another exemplary embodiment of the display device according to various aspects of the present disclosure. In this embodiment, the display device 500 comprises a photo-switchable screen 502, an image generator 504, and a timing controller (TCON) 506. The TCON 506 provides a synchronizing signal CLK to the photo-switchable screen 502 and the image generator 504 so that the photo-switchable screen 502 operates with image generator 504.

The image generator 504 receives and provides external information IME according to the synchronizing signal CLK to generate and output the output image IMO. The photo-switchable screen 502 receives a control signal SC according to the synchronizing signal CLK and determines whether to operate in the first operation mode according to the control signal SC. In one embodiment, the photo-switchable screen 502 adjusts the count value according to the synchronizing signal CLK. When the count value is equal to a predetermined value, if the control signal SC is at a first level, the photo-switchable screen 502 operates in the first operation mode. However, if the control signal is at a second level, the photo-switchable screen 502 operates in the second operation mode. The photo-switchable screen 502 and image generator 504 operate according to the synchronizing signal CLK to prevent the operation of the photo-switchable screen 502 from mismatching the operation of the image generator 504.

Figure 6:
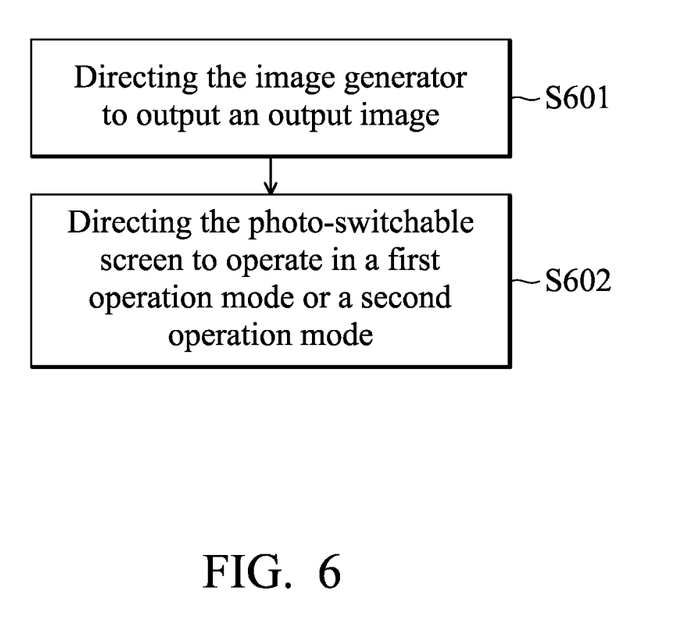
FIG. 6 is a flowchart of an exemplary embodiment of a control method according to various aspects of the present disclosure.

FIG. 6 is a flowchart of an exemplary embodiment of a control method according to various aspects of the present disclosure. The control method is applied in a display device. In one embodiment, the display device comprises an image generator and a photo-switchable screen configured to display image information. First, the image generator is directed to output an output image (step S601). In one embodiment, step S601 is to turn on a light-source or a plurality of light-sources in the image generator. In another embodiment, the image generator may utilize a periodicity method to turn on all of the light-sources in the image generator. In this case, when the light-sources are turned on, the image generator outputs the output image. When the light-sources are turned off, the image generator stops outputting the output image.

Next, the photo-switchable screen is directed to operate in a first operation mode or a second operation mode (step S602). In this embodiment, when the photo-switchable screen is directed to operate in the first operation mode, the photo-switchable screen has a first light-transmittance. In the first operation mode, the photo-switchable screen generates the image information according to the output image. However, when the photo-switchable screen is directed to operate in the second operation mode, the photo-switchable screen has a second light-transmittance. In one embodiment, the first light-transmittance is less than the second light-transmittance. In another embodiment, the photo-switchable screen may periodically operate in the first operation mode (step S602). In some embodiment, the second light-transmittance is about 50%-99%.

Figure 7:
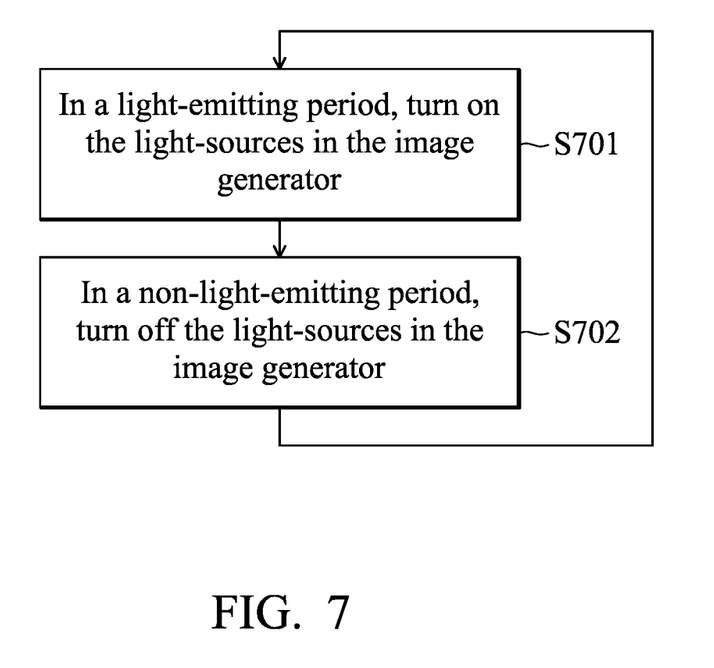
FIG. 7 is a flowchart of exemplary embodiment of the control method according to various aspects of the present disclosure.

FIG. 7 is a flowchart of r exemplary embodiment of step S601 in the control method according to various aspects of the present disclosure. First, in a light-emitting period, a light-source or a plurality of light-sources in the image generator is turned on to output the output image (step S701). In one embodiment, when the light-sources in the image generator are turned on, the photo-switchable screen is activated or is not activated. Then, in a non-light-emitting period, the light-sources are turned off to stop outputting the output image (step S702). In one embodiment, when the light-sources in the image generator are turned off, the photo-switchable screen operates in the second operation mode. At this time, since the light-transmittance of the photo-switchable screen is high, the photo-switchable screen provisionally stops reflecting the output image. In other embodiments, when the light-sources in the image generator are turned off, the photo-switchable screen is not activated.

In one embodiment, when the light-sources of the image generator are turned on, the photo-switchable screen operates in the first operation mode. In this case, when the light-sources of the image generator are turned off, the photo-switchable screen operates in the second operation mode. Taking FIG. 2A as an example, in the light-emitting periods 202, 206, 210, and 214, the light-sources of the image generator are turned on. Therefore, the photo-switchable screen operates in the second operation mode. At this time, since the light-transmittance of the photo-switchable screen is low, the photo-switchable screen is capable of reflecting the output image to generate image information. However, in the non-light-emitting periods 204, 208, and 212, the light-sources of the image generator are not turned on. Therefore, the photo-switchable screen operates in the second operation mode. At this time, since the light-transmittance of the photo-switchable screen is high, the photo-switchable screen may stop reflecting the output image.

In other embodiments, when the light-sources of the image generator are turned off, the photo-switchable screen still operates in the first operation mode. Taking FIG. 2B as an example, in the non-light-emitting periods 230 and 242, although the light-sources of the image generator are turned off, the photo-switchable screen still operates in the first operation mode. Similarly, in FIG. 2C, the light-sources of the image generator are turned off in the non-light-emitting periods 248 and 256. At this time, the photo-switchable screen still operates in the first operation mode. In this case, the durations of the non-light-emitting periods 248 and 256 are less than the duration of the non-light-emitting period 252, and the durations of the light-emitting periods 246, 250, 254, and 258 are the same as each other.

In some embodiments, when the light-sources of the image generator are turned on, the photo-switchable screen may operate in the second operation mode. Taking FIG. 2B as an example, the light-sources of the image generator are turned on in the light-emitting period 236. However, the photo-switchable screen operates in the second operation mode.

In one embodiment, in step S701, when the output image is output to a first area of the photo-switchable screen, the photo-switchable screen sets the light-transmittance of the first area to low and sets the light-transmittance of a second area to high, wherein the second area is outside of the first area. In this case, since the first area has a low light-transmittance, the first area is capable of reflecting the output image.

The present disclosure does not limit when the photo-switchable screen operates in the first operation mode and the second operation mode. In one embodiment, the photo-switchable screen determines whether to operate in the first operation mode according to the level of a control signal. For example, when the level of the control signal is equal to a specific level (e.g., a high level), the photo-switchable screen operates in the first operation mode. However, when the level of the control signal is not equal to the specific level, the photo-switchable screen operates in the second operation mode.

In other embodiments, a timing controller is used to synchronize the operations of the image generator and the photo-switchable screen. The timing controller provides a synchronizing signal to the image generator and the photo-switchable screen. In this case, the image generator receives an external image according to the synchronizing signal to generate the output image. At this time, the photo-switchable screen adjusts the count value according to the synchronizing signal. When the count value is equal to a predetermined value, the photo-switchable screen determines whether to operate in the first operation mode according to the level of the control signal. For example, if the level of the control signal is equal to a specific level, the photo-switchable screen operates in the first operation mode. However, if the level of the control signal is not equal to the specific level, the photo-switchable screen operates in the second operation mode.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a display device for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a display device for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A control method applied in a display device which comprises an image generator and a screen, comprising:
   directing the image generator to output an output image; and
   directing the screen to operate in a first operation mode or a second operation mode,
   wherein:
   the screen has a first light-transmittance in the first operation mode and has a second light-transmittance in the second operation mode,
   the first light-transmittance is different from the second light-transmittance, and
   in response to the screen operating in the first operation mode or the second operation mode, the image generator outputs the output image onto the screen in a light-emitting period and stops outputting the output image onto the screen in a non-light-emitting period after the light-emitting period,
   the image generator comprises a light source,
   in response to the screen operating in the first operation mode and the second operation mode, the light source is turned on in the light-emitting period and is turned off in the non-light-emitting period.

2. The control method as claimed in claim 1, wherein the first light-transmittance is less than the second light-transmittance.

3. The control method as claimed in claim 2, wherein in response to the screen operating in the first operation mode, the image generator outputs the output image onto the screen and stops outputting the output image onto the screen.

4. The control method as claimed in claim 3, wherein in response to the screen operating in the second operation mode, the image generator outputs the output image onto the screen and stops outputting the output image onto the screen.

5. The control method as claimed in claim 1, wherein the output image comprises a first image and a second image.

6. The control method as claimed in claim 5, wherein the image generator outputs the first image onto a first area of the screen and outputs the second image onto a second area of the screen, and the first area and the second area are not overlapped.

7. The control method as claimed in claim 5, wherein the image generator outputs the first image onto a first area of the screen and outputs the second image onto a second area of the screen, and the first area and the second area are at different height related to a bottom of the screen.

8. A control method applied in a display device which comprises an image generator and a screen and is disposed in front of a front seat of a vehicle, comprising:
   directing the image generator to output an output image; and
   directing the screen to operate in a first operation mode or a second operation mode,
   wherein:
   the screen has a first light-transmittance in the first operation mode and has a second light-transmittance in the second operation mode,
   the first light-transmittance is different from the second light-transmittance, and
   in response to the screen operating in the first operation mode or the second operation mode, the image generator outputs the output image onto the screen in a light-emitting period and stops outputting the output image onto the screen in a non-light-emitting period after the light-emitting period,
   the image generator comprises a light source,
   in response to the screen operating in the first operation mode and the second operation mode, the light source is turned on in the light-emitting period and is turned off in the non-light-emitting period.

9. The control method as claimed in claim 8, wherein the first light-transmittance is less than the second light-transmittance.

10. The control method as claimed in claim 9, wherein in response to the screen operating in the first operation mode, the image generator outputs the output image onto the screen and stops outputting the output image onto the screen.

11. The control method as claimed in claim 10, wherein in response to the screen operating in the second operation mode, the image generator outputs the output image onto the screen and stops outputting the output image onto the screen.

12. The control method as claimed in claim 8, wherein the output image comprises a first image and a second image.

13. The control method as claimed in claim 12, wherein the image generator outputs the first image onto a first area of the screen and outputs the second image onto a second area of the screen, and the first area and the second area are not overlapped.

14. The control method as claimed in claim 12, wherein the image generator outputs the first image onto a first area of the screen and outputs the second image onto a second area of the screen, and the first area and the second area are at different height related to a bottom of the screen.

\* \* \* \* \*